Oct. 29, 1957          R. CASS          2,811,347
VARIABLE RATE TORSION SPRING
Filed Sept. 12, 1955
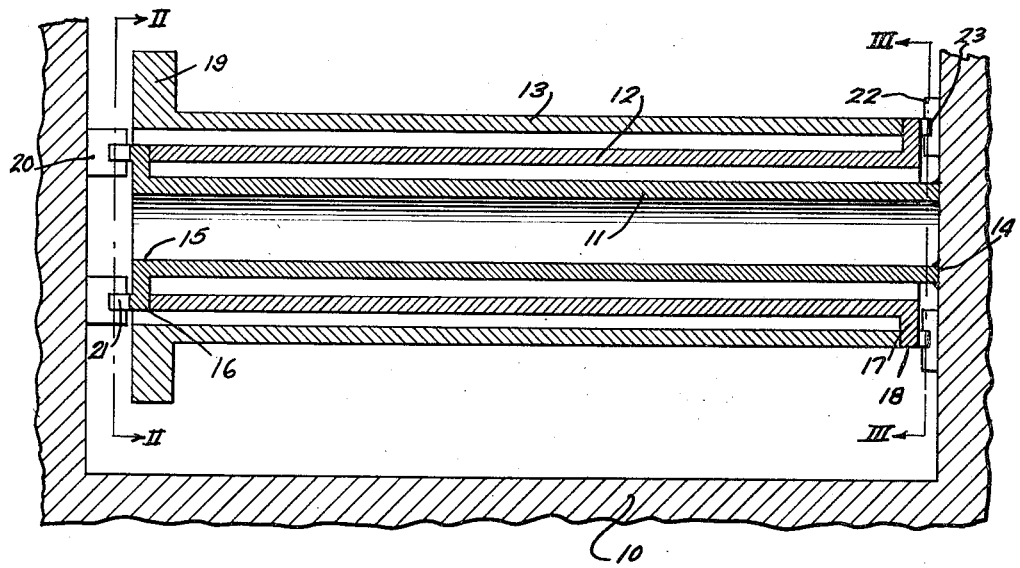
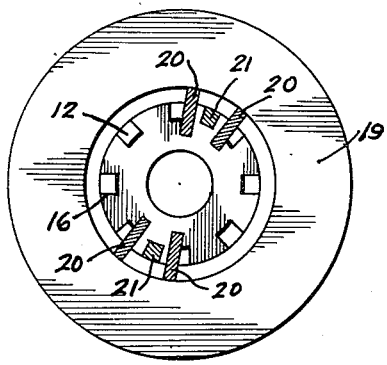 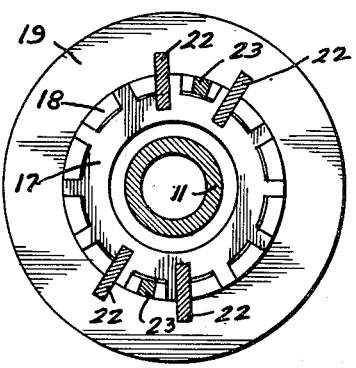
Inventor
RICHARD CASS

United States Patent Office

2,811,347
Patented Oct. 29, 1957

2,811,347

VARIABLE RATE TORSION SPRING

Richard Cass, Birmingham, Mich., assignor to Thompson Products, Inc., Cleveland, Ohio, a corporation of Ohio Application September 12, 1955, Serial No. 533,755

2 Claims. (Cl. 267—57)

The present invention relates to the construction and mounting of torsion springs and is, more particularly, concerned with the provision of a torsion spring capable of accepting large force applications over a wide range of spring deflection with a minimum stress in the spring components.

Tubular or solid bar type torsion springs have, of course, been known and utilized for many years. Among the important uses for such springs, commonly called torsion bar springs, include vehicle springs, instrument springs, and springs for machinery wherein space limitations make conventional helical or leaf springs undesirable. Among the practical limitations of the conventional torsion bar spring, as used in the past, is the requirement that the spring be relatively long in installations where substantial spring deflection is necessary. A further difficulty has been encountered in maintaining the stress level of torsion bar springs at a low level when large deflections are required of the spring. While low stress levels may, of course, be obtained in such circumstances by using an extremely long torsion bar space limitations ordinarily make such a solution impractical and, further, uniform heat treatment of long bars becomes extremely difficult and is ordinarily considered commercially impracticable.

In accordance with the present invention a torsion bar spring is provided in which the spring length is maintained at a minimum and yet the stress level of the spring as a whole is low in spite of provision for large spring deflection. Further, in accordance with the principles of the present invention a torsion bar spring is provided in which the stress level of components of the spring is accurately controlled throughout the range of spring deflection.

The above functions permit a substantial reduction in space requirements and greatly simplify heat treatment processing. They are accomplished in accordance with the present invention by providing a plurality of concentric, nested, tubes of any satisfactory spring material. The first tube, which may be either the innermost or outermost tube, is secured at a reaction member such as a frame or other fixed structure. The next adjacent tube is secured to the first tube at the end thereof opposite to its point of securement to the fixed element. The next spring tube after the second tube above mentioned is secured to the second tube at the end of the second tube opposite to the end thereof secured to the first tube, etc. In addition to the concentric nested relationship, stops are provided on the fixed supporting surface for intercepting cooperating abutments on the individual spring tubes. Accordingly, as the spring deflection increases the first spring tube will be fixedly stopped against rotation beyond a predetermined point at which all spring deflections must occur in subsequent spring tubes. In the same manner, the second spring tube will be stopped against deflection beyond a predetermined higher deflection point and, likewise, the third and fourth, fifth, etc., spring tubes may be fixedly stopped at predetermined increased points of deflection. In this manner, deflections of the torsion bar spring as a whole may reach a large value without overstressing the initially deflected portions. Additionally, through this technique, a relatively low spring rate may be incorporated for initial spring movement and an increasingly greater spring rate incorporated for the larger deflections, without danger of overstressing any portion of the spring.

It is, accordingly, an object of the present invention to provide an improved torsion spring system.

Still another object of the present invention is to provide a torsion bar spring unit having a variable spring rate and a low spring stress substantially independently of the amount of spring deflection.

Yet a further object of the present invention is to provide a short torsion spring capable of substantial deflection at a controlled rate.

Still another object of the present invention is to provide a variable rate spring having an initial high ratio of deflection to applied force and a progressively lower ratio of deflection to applied force without exceeding a predetermined safe stress in those portions of the spring having a high ratio characteristic.

A feature of the invention resides in the provision of concentric, nested, torsion spring tubes serially connected to each other and adapted for sequential cooperation with fixed stop members to thereby limit the extent of rotation of each individual tubular spring member except the outermost spring tube.

Still other and further objects and features of the present invention will at once become apparent to those skilled in the art from a consideration of the attached drawing wherein a preferred embodiment of the invention is shown by way of illustration only, and wherein:

Figure 1 is a side elevational view in cross section illustrating in diagrammatic form a preferred form of the present invention;

Figure 2 is an end elevational view in partial cross section taken along the line II—II of Figure 1; and Figure 3 is a second end elevational view, in partial cross section, taken along the line III—III of Figure 1.

As shown on the drawings:

In the diagrammatic illustrations set forth in the drawing, a fixed reaction member or base 10 is provided. This base may, of course, in actual practice take various forms. For example, where the spring of the present invention is to be utilized with automotive vehicles, it is contemplated that the rigid vehicle frame supply the fixed base 10. It will, of course, be understood that the exact configuration of the base 10 is unimportant as long as it is sufficiently adaptable to provide spaced supports and clearance for the spring elements to be described below.

The torsion spring assembly of the present invention comprises a plurality of nested, concentric spring elements. While it will be understood that substantially any number of such elements may be utilized, three such elements 11, 12 and 13 are illustrated in the drawings. As shown, the innermost spring element 11 comprises a tube and is secured rigidly to the base member 10, as at 14. The innermost spring element 11 may comprise a tube as shown, or, alternatively, a solid bar.

At the end 15 of element 11, which is opposite to the end 14 secured to the base member 10, the element 11 is secured to element 12 by means of a radially splined connection indicated at 16. The spring sleeve element 12 is, in turn, positively connected by its end 17 to the outermost spring element 13, as at splined connection 18. In view of the above arrangement, rotation of the outermost spring element 13, for example by the application of a rotary torsional force to the flange 19, will cause the torque to be transmitted to the innermost spring element 11 through the intermediate element 12. Since the innermost spring tube element 11 is of a smaller diameter than elements 12 and 13 it has, effectively, a higher ratio of deflection to force than elements 12 and 13 assuming the three spring tubes to be constructed of the same material and thickness and will deflect at a greater rate than the latter.

Stops are provided to prevent deflection of the innermost sleeve tube 11 beyond a predetermined load application, so that it is impossible for the tube element 11 to twist beyond a predetermined safe stress. The stop means comprises one or more, preferably diametrically balanced, abutment stops 20 secured to the base member 10 for cooperation with axially projecting fingers 21 on the spring element 11.

In operation, as soon as sufficient force has been applied to flange 19 to cause a torsional twist in the spring 11 to move the fingers 21 into abutment with the stops 20, continued twisting of the sleeve or tube 11 is prevented. The application of continued torque to the flange 19 will, instead, cause torsional twist in the intermediate spring element 12 and the outermost element 13. As soon as the intermediate element 12 reaches its point of maximum safe stress, it is effectively prevented from further twisting motion by stops 22 secured to the base member 10 for cooperation with extending fingers 23 integrally formed with the spring element 13 as an extension thereof. Since the spring element 12 is secured to the element 13 by a positive spline connection 18, mentioned above, prevention of continued rotation of the point 23 on the outermost spring element 13 will prevent additional twisting of the element 12. Continued torque applications must be absorbed by the outermost spring element 13 which is, due to its greater diameter, substantially more rigid than the elements 11 and 12. It will, of course, be understood that additional sleeve or tube spring elements may be provided and serially connected to each other in a nested, concentric, manner as illustrated. In such case, additional stops may be provided if desired.

In view of the nested relationship above illustrated, a torsion spring of a relatively long effective length may be provided in a very small space. Further, very accurate control of the deflection of the spring may be had since, during initial, small force, deflections the major deflection of the spring occurs in the innermost spring element 11. By providing abutment stops for sequential engagement with portions of the spring assembly, a very flexible spring is provided while at the same time the stresses built up in the spring elements are maintained at values far below the point at which permanent deformation takes place.

Not only is the spring construction above set forth extremely compact and capable of operation over wide ranges of force application, but it is far simpler to heat treat since it comprises tubular spring elements of an axially limited nature. Such springs may be inserted in conventional heat treating furnaces, or the like, without danger of non-uniform heating. Likewise, in the quenching operation, uniformity becomes far simpler than the similar process applied to the conventional, relatively long, torsion bar type of spring.

It will thus be seen that I have provided a novel and substantially improved variable rate torsion type spring for use in automotive vehicle suspension systems, or the like. It will be understood that variations and modifications may be made in the structure as above set forth without departing from the scope of the novel concepts of the present invention. For example, it will be apparent that the stops 20 and 22 may be adjustable to permit greater or less rotation of respective spring elements 11 and 12. Likewise, it will be apparent that the spline connections 16 and 18 may be modified if desired to provide any conventional positive means for connecting the respective spring elements together. Accordingly, it is my intention that the scope of the present invention be limited solely as necessitated by the hereinafter appended claims.

I claim as my invention:

1. A variable rate torsion spring assembly comprising a first centrally positioned elongated torsion spring element fixedly secured at one end to a base member, a second tubular torsion spring element splined at one end to the other end of said first torsion spring element, a third torsion spring element connected to the other end of said second torsion spring element by a splined connection, said torsion spring elements lying in concentric nested relation, lost motion stop means associated with said base member and each of said splined connections for preventing movement of said splined connections beyond a predetermined limit, and means for applying a torsional load to the free end of said third torsion spring element, at least one of said splined connections comprising a slotted radial flange on one spring element and axially projecting fingers on the next adjacent spring element, said fingers projecting axially through the slots and beyond the flange to cooperate with respective fixed abutment stops whereby said splined connection performs the function of rigidly interconnecting adjacent spring elements and providing a lost motion stop with said base member.

2. A variable rate torsion spring assembly comprising a first centrally positioned elongated torsion spring element fixedly secured at one end to a base member, a second tubular torsion spring element splined at one end to the other end of said first torsion spring element, a third torsion spring element connected to the other end of said second torsion spring element by a splined connection, said torsion spring elements lying in concentric nested relation, lost motion stop means associated with said base member and each of said splined connections for preventing movement of said splined connections beyond a predetermined limit, and means for applying a torsional load to the free end of said torsion spring element, at least one of said splined connections having at least one of the splines thereof projecting beyond the adjacent spring element in an axial direction for cooperation with a respective stop abutment on said base member.

References Cited in the file of this patent

UNITED STATES PATENTS

| | | |
|---|---|---|
| 785,323 | Nadrowski | Mar. 21, 1905 |
| 2,043,542 | Johnson | June 9, 1936 |
| 2,069,270 | Piron | Feb. 2, 1937 |
| 2,103,590 | Lefevre | Dec. 28, 1937 |
| 2,160,541 | Dubonnet | May 30, 1939 |

FOREIGN PATENTS

| | | |
|---|---|---|
| 450,142 | Great Britain | July 8, 1936 |
| 688,421 | Germany | Feb. 20, 1940 |